Dec. 15, 1953     H. H. PAYZANT     2,662,564
CONTINUOUS GLUING PRESS
Filed Oct. 27, 1947                      6 Sheets-Sheet 1

INVENTOR.
Henry H. Payzant
BY
Attorney

Dec. 15, 1953   H. H. PAYZANT   2,662,564
CONTINUOUS GLUING PRESS
Filed Oct. 27, 1947   6 Sheets-Sheet 2

INVENTOR.
Henry H. Payzant
BY
Attorney

Dec. 15, 1953         H. H. PAYZANT         2,662,564
              CONTINUOUS GLUING PRESS
Filed Oct. 27, 1947                  6 Sheets-Sheet 3

INVENTOR.
Henry H. Payzant
BY
Attorney

Dec. 15, 1953    H. H. PAYZANT    2,662,564
CONTINUOUS GLUING PRESS
Filed Oct. 27, 1947    6 Sheets-Sheet 4
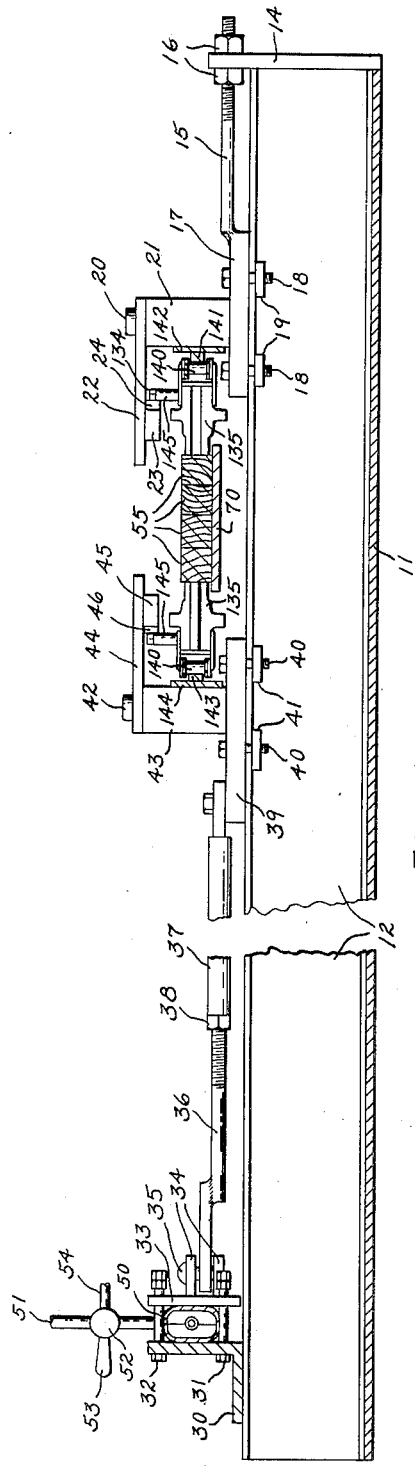
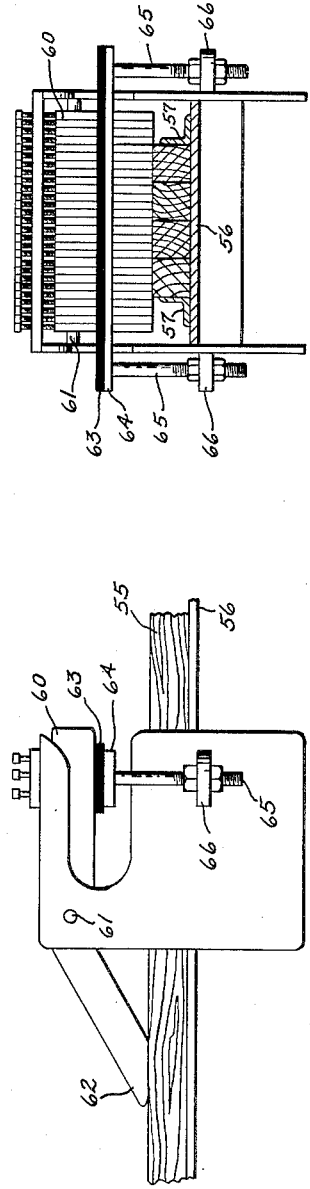
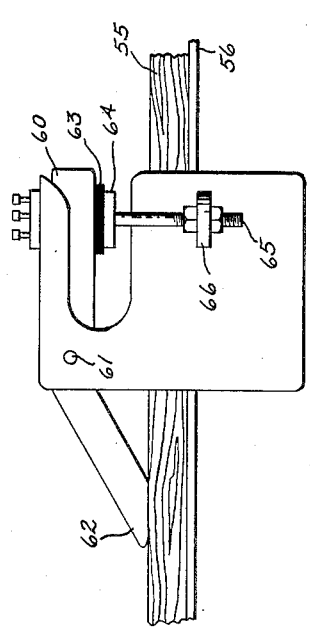
INVENTOR.
Henry H. Payzant
BY
Attorney Dec. 15, 1953 H. H. PAYZANT 2,662,564
CONTINUOUS GLUING PRESS
Filed Oct. 27, 1947 6 Sheets-Sheet 5

INVENTOR.
Henry H. Payzant
BY
Attorney

Dec. 15, 1953     H. H. PAYZANT     2,662,564
CONTINUOUS GLUING PRESS

Filed Oct. 27, 1947     6 Sheets-Sheet 6

INVENTOR.
Henry H. Payzant
BY
Attorney

Patented Dec. 15, 1953

2,662,564

UNITED STATES PATENT OFFICE 2,662,564

CONTINUOUS GLUING PRESS

Henry Harris Payzant, Seattle, Wash., assignor to Timber Structures, Inc., a corporation of Delaware Application October 27, 1947, Serial No. 782,351

23 Claims. (Cl. 144—1)

The object of the present invention is to provide means for automatically forming laminated articles, particularly articles formed of heavier elements than are usually used in the production of laminated articles, although not necessarily limited to such heavy laminations, and particularly for forming curved articles of various degrees of curvature and various sizes, although the methods are readily applicable to the formation of, and the machine may be adjusted to form, articles having normally straight configuration. The method herein disclosed is an improvement upon the method set forth in my Patent No. 2,571,604 dated October 16, 1951, entitled Manufacture of Laminated Wooden Members, and the machine herein disclosed may be utilized to carry out the steps of the method claimed in the aforesaid application.

The principal object of the present invention is to form curved wooden beams or structural elements, in order to provide trusses or other structures, with load bearing members of unusual rigidity and strength. A further object of the present invention is to provide a method and machine for the automatic formation of curved wooden beams of various degrees of curvature and size.

A further object of the present invention is to conserve diminishing natural resources by providing means to utilize small scraps, boards or bars of wood, which may be formed from small trees or from scrap slab wood, to produce structural members which normally could only be supplied by utilizing large portions of large tree trunks with a great deal of wastage, or by tedious and expensive methods of shaping and joining short sections of normally straight beams.

A further object of the present invention is to provide a machine and method for forming articles of laminations of material and a thermosetting resin including heat generating means of the high frequency flux type having unusual efficiency whereby high-speed, continuous flow production may be maintained.

A further object of the present invention is to provide a laminating machine for making long laminated articles of various degrees of curvature, which may be easily and quickly shifted to maintain the machine in proper working relationship with extraneous equipment such as assembling and feeding equipment.

A further object of the present invention is to provide a machine wherein a completely dressed laminated beam or wooden arch may be produced regardless of the thickness, width and degree of curvature of the beam or arch, within certain limits.

The invention is illustrated and described in the instant application as applied to the formation of curved wooden beams by laminating smaller bar stock, but the objects and advantages of the present invention are equally applicable to the manufacture of other laminated articles or structures such as plywood, laminated fiberboard articles, laminated barrel or tank staves and curved laminated articles formed of laminations of materials of various types.

The objects and advantages of the present invention will be more readily apparent from inspection of the accompanying drawings taken in connection with the following specification wherein like numerals refer to like parts throughout.

In the drawings Fig. 1 is a plan view with portions broken away of a machine embodying the present invention and so designed as to form a curved laminated wooden beam;

Fig. 4 is a vertical section with portions removed, taken substantially along line 4—4 of Fig. 1;

Fig. 5 is a side elevation of a portion of the machine taken substantially from line 5—5 of Fig. 1;

Fig. 6 is a front elevation of the portion of the machine shown in Fig. 5, taken from line 6—6 thereof;

Figure 1:
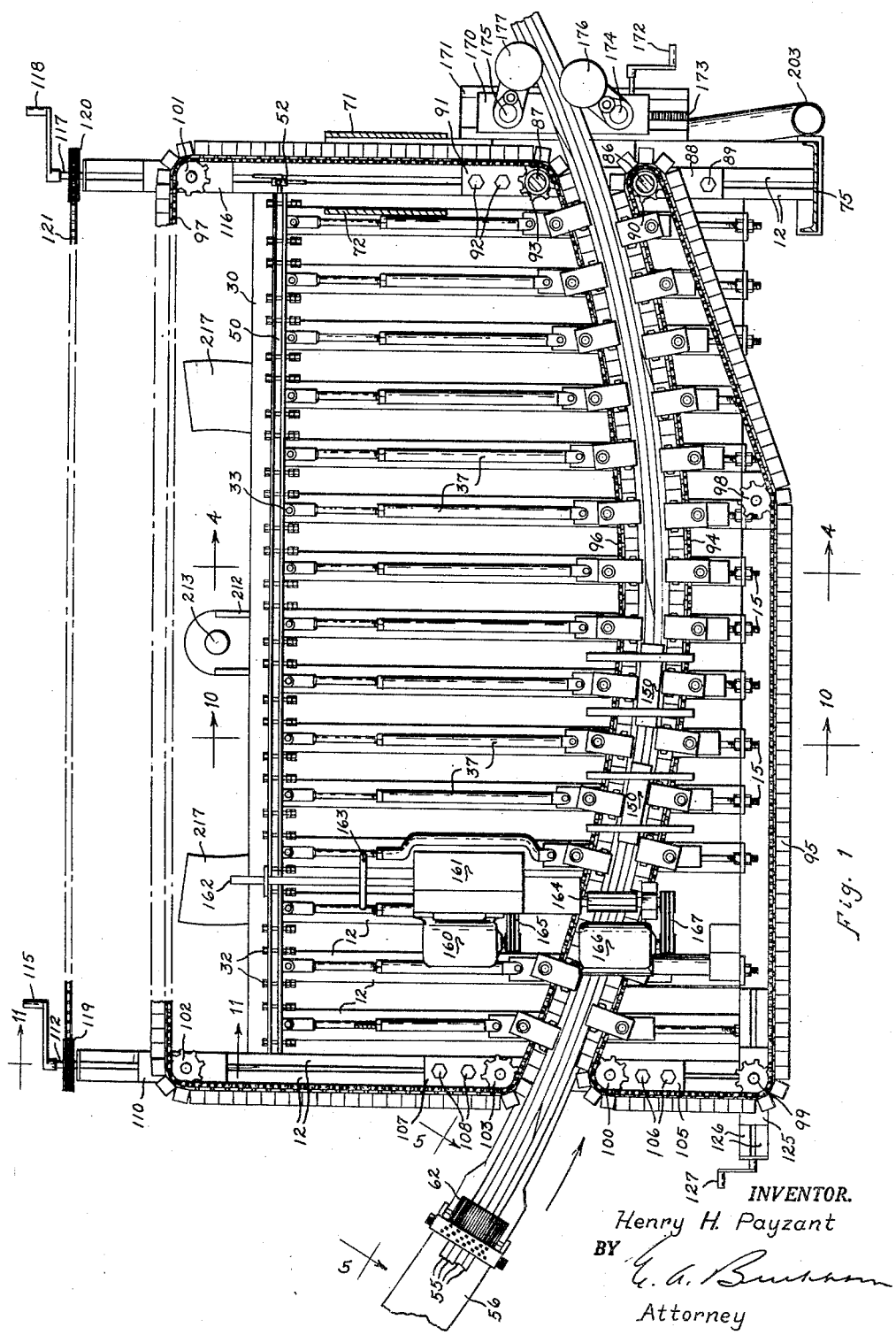
Figure 2:
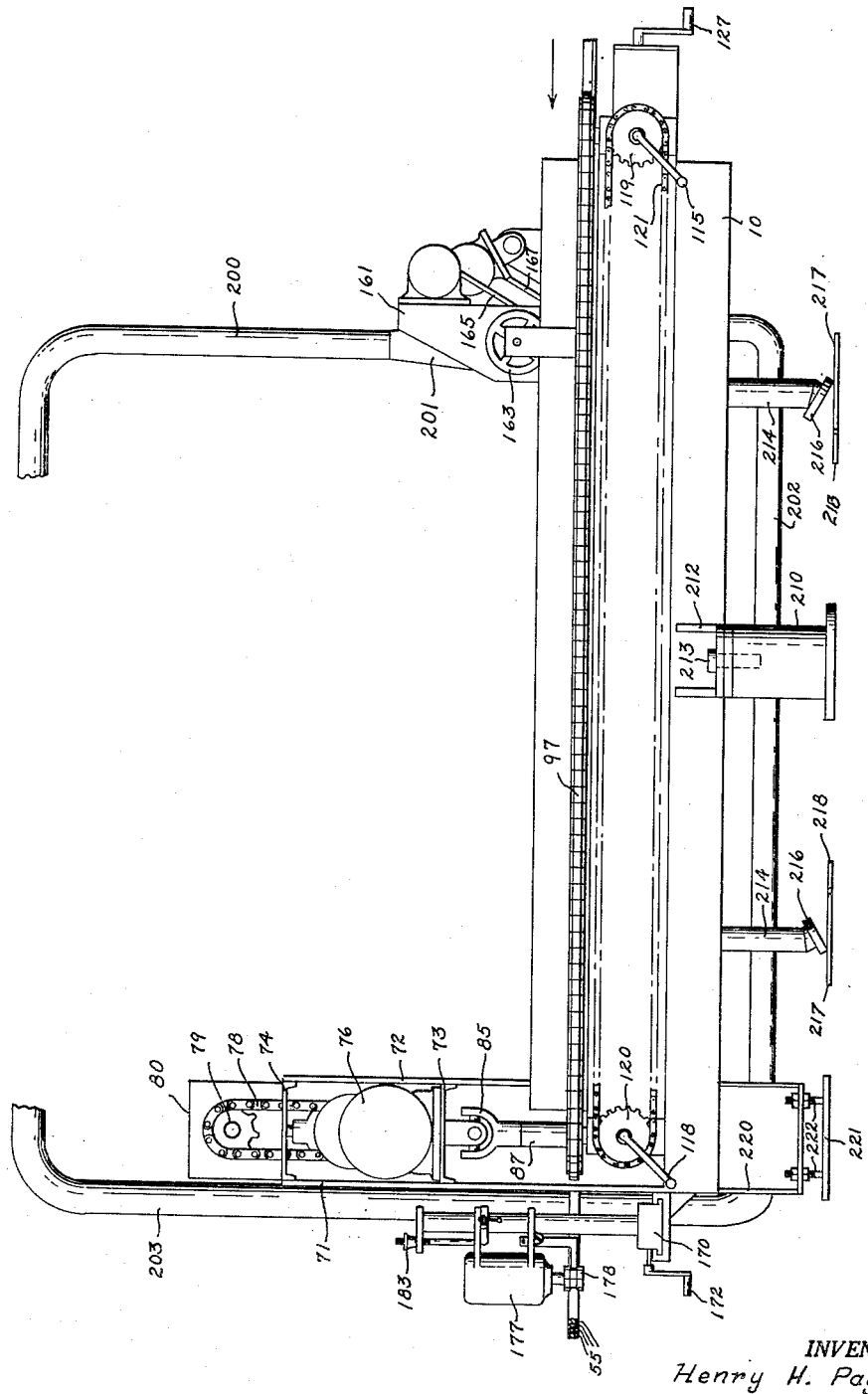
Fig. 2 is a side elevation of the machine (taken from the top of Fig. 1)

The machine of the present invention comprises a supporting structure 10 including a heavy flat plate 11 which extends beneath most of the machine. The plate 11 supports a plurality of pairs of channel bars 12 extending transversely of the machine with their flanges extending toward each other to form hollow guides extending from side to side of the structure. The pair of channel members 12 at the entering side of the machine (the left of Fig. 1) extends beyond the rear of the machine and the pair of channel members 12 at the exit side of the machine extends beyond the front and rear thereof for a purpose to be described.

Each of the intermediate pairs of channel members 12 provide guides for mounting a plurality of conveyor guiding means. The conveyor guiding means at the front of the machine comprise upright plates 14 mounted across the front ends of the channel members and having threaded openings therethrough for the reception of threaded rods 15 retained in adjusted positions by nuts 16. The rods 15 are welded to blocks 17 which are slidable upon the channel members 12 and retained and guided by bolts 18 passing through the slots therebetween and nuts 19 engaging the lower surfaces of the flanges. A vertical pivot member 20 having a collar at its upper end retains a spacer 21 in upright position on the block 17. An overhanging plate 22 extends forwardly from the top of the spacer 21 and supports a depending cam 23 having a rounded vertical face 24. At the rear of the machine the channels 12 are attached to a longitudinally extending angle iron 30 which supports a plurality of horizontally extending lower guide bolts 31 and upper guide bolts 32 having nuts and lock nuts at their free ends. Slidably mounted on the guide bolts is a vertical plate 33 extending longitudinally of the machine and provided with a plurality of pairs of lugs 34 for the reception of pivot pins 35 aligned with the slots between the channel members 12. A threaded rod 36 is pivotally fastened to the pivot 35 and extends into a horizontal tube 37 in which it is retained in adjusted position by a rotatable nut 38. The forward end of the tube 37 is attached to a sliding block 39 guided for movement by bolts 40 extending between the channel members and nuts 41 thereon. A vertical pivot post 42 retains an upright collar 43 having a forwardly extending arm 44 provided with a depending cam 45 having a curved cam surface 46.

Each of the collars 21 and 43 may therefore be adjusted independently of the others so as to provide a path therebetween of any configuration ranging from straight to various degrees of curvature up to the limit of flexibility of the material being laminated or the limits of the machine. The tubes 37 may if desired by replaced by shorter or longer tubes in certain cases in order to accommodate extreme adjustments, and similarly rods 15 and 36 may be formed with longer threaded portions for affecting various degrees of adjustment.

The entire set of plates 39 is adapted to be pressed elastically toward the plates 17 by means including a flexible container such as a section of fire hose 50 placed between the upright leg of the angle bar 30 and the vertical plate 33, the hose being inflatable by fluid entering through a supply tube 51 under control of a two-way valve 52 having a handle 53. When it is desired to release pressure against an article being laminated the fluid may be exhausted from the hose 50 by turning the handle 53 to shut off the supply tube 51 and open an exhaust tube 54.

Articles to be laminated, such as a plurality of substantially squared and straight bars 55, may be assembled in face to face relationship and provided with an adhesive (preferably a thermosetting adhesive of which there are many available such as the phenolic resin base adhesives) on extraneous assembling and feeding equipment such as exemplified by the bed 56 adjacent the entering end of the machine. The assembled elements with the moist unset adhesive between adjacent faces thereof are advanced across the bed 56 between guides 57 while being retained thereon by pressure elements of any suitable nature such as the plurality of pivoted bars 60 mounted upon a horizontal pivot 61 and having downwardly extending fingers 62 engaging the top of the assembled unit. The rear extremities of the bars 60 may be supported upon a rubber pad 63 mounted upon a horizontal plate 64 and provided with depending rods 65 passing through lugs 66 and nuts whereby the compression of the fingers 62 may be maintained within resilient limits, each of the bars being yieldable to accommodate individual variations or rough spots in the material. The table 56 terminates shortly after extending into the space between the members 21 and 43 and is thereafter succeeded by a plurality of short bed sections 70 having spaces therebetween for a purpose to be described, the sections 70 (Fig. 4) being suitably mounted upon the channel members 12 in any convenient manner (not shown).

At the exit end of the machine the support 10 supports a pair of vertical plates 71 and 72 which straddle the last pair of channel members 12 and extend to a considerable height thereabove, the plates 71 and 72 supporting an intermediate shelf 73 and an upper shelf 74 which extends across the machine and is supported by a vertical channel member 75 at the front end of the last pair of channel members 12. The intermediate shelf 73 supports a reduction gear motor 76 which drives a sprocket 77 and a vertically extending sprocket chain 78 passing about a sprocket 79 on a differential gear box 80 mounted on the upper shelf 74. The gear box contains gears (not shown) for driving a depending pair of shafts 81 connected through universal joints 82 to a pair of spline shafts 83 which extend into telescoping shafts 84 having universal joints 85 at the lower ends thereof. The universally shiftable driving shafts so formed drive a pair of horizontally spaced vertical shafts 86 and 87 mounted substantially in line with the members 21 and 43 respectively. The shaft 86 is supported upon and extends upwardly from a longitudinally shiftable block 88 retained and guided along the channel members 12 by means such as the bolt 89, whereby the position of a sprocket 90 may be suitably adjusted. Similarly shaft 87 is supported on a block 91 guided upon the channel members 12 by bolts 92 and drives shiftable sprocket 93. The gear box 80 assures constantly uniform application of driving force to the two sprockets 90 and 93.

A pair of conveyors are mounted in a substantially horizontal common plane upon the support 10, each comprising a sprocket chain driven by its respective sprocket 90 or 93 and arranged so as to have working flights traveling in the same direction while maintained in substantial parallelism by the guiding means including plates 17 and 39. The sprocket 90 drives a shorter sprocket chain having a working flight 94 and a return flight 95, and the sprocket 93 drives a longer chain having a working flight 96 and a return flight 97. The short chain passes about the driving and working flight engaging sprocket 90, a return flight idler sprocket 98, an adjustably mounted return flight idler sprocket 99, and a second adjustably mounted idler working flight sprocket 100. The longer chain passes about the working flight driving sprocket 93, and adjustably mounted idler return sprocket 101, a second adjustably mounted idler return flight sprocket 102 and an adjustably mounted idler working flight sprocket 103. The general spacing of the sprockets and the lengths and outlines of the chains may vary considerably, it being merely necessary that proper clearance be provided for the various parts and the functioning of the various parts. The sprocket 100 is mounted upon a block 105 retained and guided along the channel members 12 by bolts 106, and the sprocket 103 is mounted upon a plate 107 retained and guided along the channels 12 by bolts 108, whereby the positions of the sprockets 100 and 103 may be adjusted to maintain the sprockets in line with the chain guiding members and the driving sprockets to accommodate different widths of beams or other articles being formed.

The sprocket 102 is mounted upon a member 110 having a pair of depending threaded guides 111 passing into the space between the channel members 12 and engaging an adjusting screw 112 extending through the end plate 113 and having a collar 114 thereon, the screw being provided with a crank 115 which when rotated adjusts the position of sprocket 102 to take up or provide slack in the long conveyor chain. At the opposite end of the machine sprocket 101 is mounted upon a similar adjusting block 116 which may be operated by a screw 117 and a crank 118. Preferably screws 112 and 117 support sprockets 119 and 120 respectively, about which passes a sprocket chain 121 in order that operation of either crank 115 and 118 may provide simultaneous and uniform adjustment of the two return flight sprockets.

Idler sprocket 99 is preferably mounted upon a block 125 slidably adjustable longitudinally of a pair of guide members 126 by means of a crank 127 so that slack may be taken up or provided in the short conveyor chain.

The provision of means for adjusting the tension of the conveyor chains accomplishes several functions; first, the correct tension may be applied to the chains for efficient operation; second, a greater or lesser length of chain may be provided in each working flight to accommodate various curvatures of material being formed; and third, slack may be provided in order that the working flight conveyors may be adjusted to accommodate different widths of materials.

Figure 7:
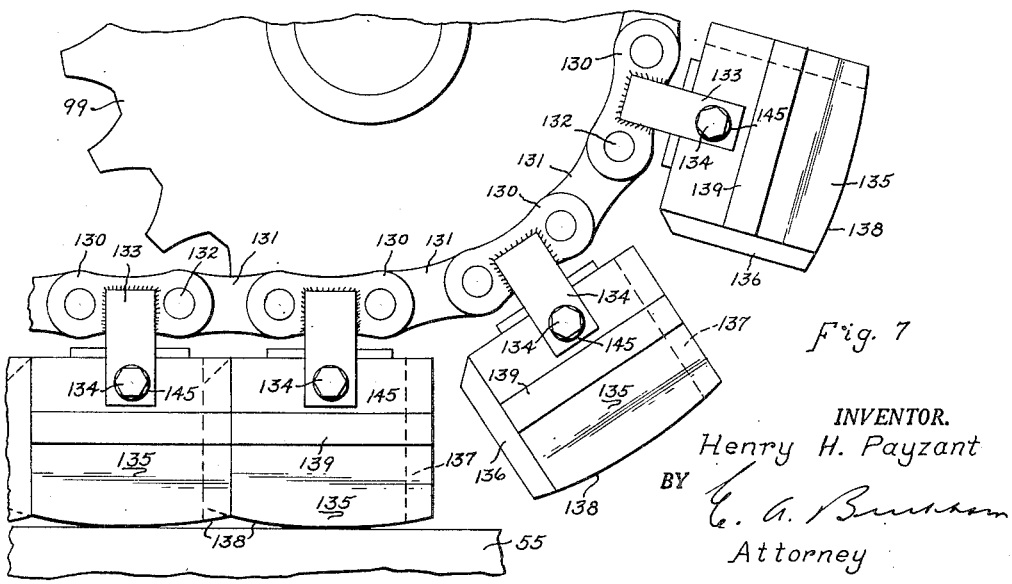
Fig. 7 is a partial plan view on a greatly enlarged scale of a portion of the machine.

The conveyor chains (Fig. 7) preferably comprise standard sprocket link chains having outer link members 130 and inner link members 131 connected by suitable pivot pins 132. The outer link members 130 are preferably welded to a pair of outwardly extending bars 133 providing support for a vertically extending pivot bolt 134, the pivot bolt passing through and retaining an outwardly projecting block of dielectric material 135 against a backing plate welded between the bars 133. One end of each block 135 is preferably provided with a tongue 136 adapted to fit into a groove 137 in the adjacent end of the next block when the chain is in straight line or curves of the normal extent of curvature for which the machine is designed. As seen in Fig. 7 the blocks separate as the chain passes about the sprocket gears such as the idler sprocket 99. The outer end of each block 135 is preferably provided with a rounded surface 138 so that the contact of each block with the surface of the material being engaged thereby is very slight, being practically a line contact in order that slippage between the surface of each block and the surface of the material may be relatively easily accomplished within certain limits. The upper and lower surfaces of each block are preferably provided with vertical ridges 139 extending beyond the bars 133 to a considerable extent for a purpose to be described.

As the working flight of the short conveyor passes next to the upright members 21 roller spacers 140 surrounding the pins 132 engage a guide bar 141 welded to the front surface of a flat strip of material 142 extending between the front surfaces of the uprights 21 and providing a continuous track to smoothen the curvature of the working flight. Similarly rollers 140 on the working flight of the longer chain engage a bar 143 mounted upon a plate 144 extending along the surfaces of the uprights 43 so as to smoothen the curvature of the opposed working flight. Each of the dielectric block mounting pins 134 supports a vertical roller 145 which extends above the conveyor chains to a sufficient distance to engage the rounded cam surfaces 24 and 46 respectively of the sets of chain guiding devices. The cams 23 and 45 therefore provide spaced means for assuring maintenance of the rollers 140 against the respective guide bars 141 and 143, and also intermittently release extreme pressure of one of the blocks 135 and shift its position slightly to permit the material to assume arcuate shapes. A sort of kneading action is thereby provided which permits the laminations to slip relatively to each other and reduces strains caused by the bending action as much as possible. In Fig. 1 it will be seen that the cams are staggered to a considerable extent adjacent the entry to the working flights where the greatest amount of kneading action is desirable.

Figure 10:
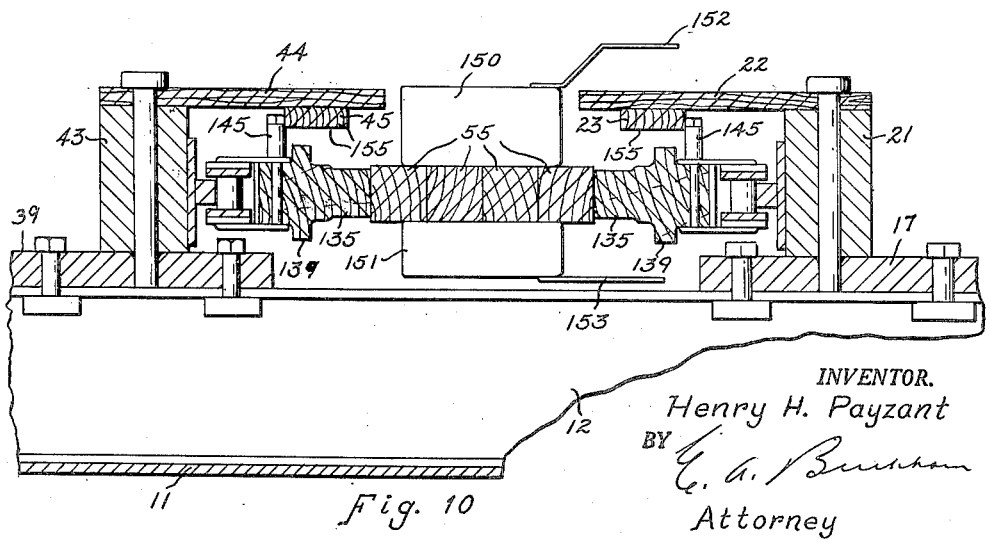
Fig. 10 is a partial vertical section on an enlarged scale taken substantially along line 10—10 of Fig. 1.
Figure 11:
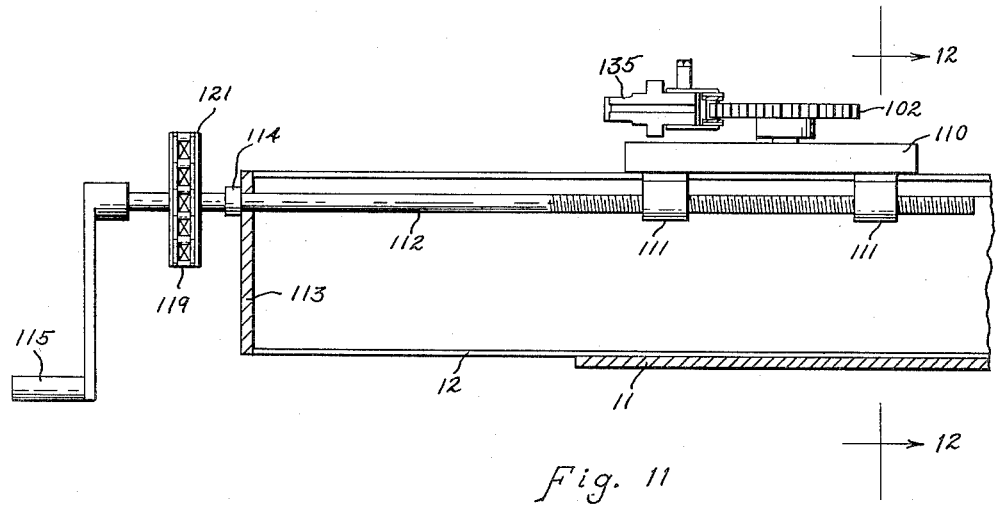
Fig. 11 is a partial vertical section on an enlarged scale taken substantially along line 11—11 of Fig. 1.
Figure 12:
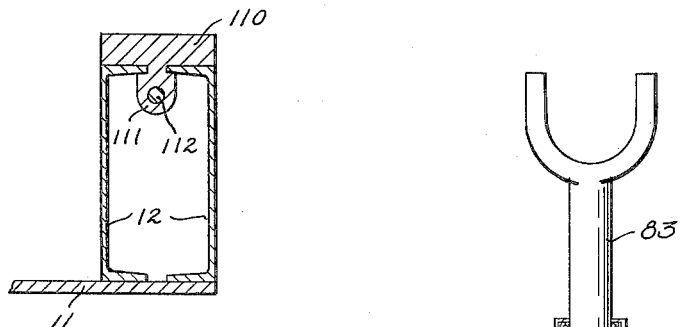
Fig. 12 is a vertical section taken along line 12—12 of Fig. 11.
Figure 14:
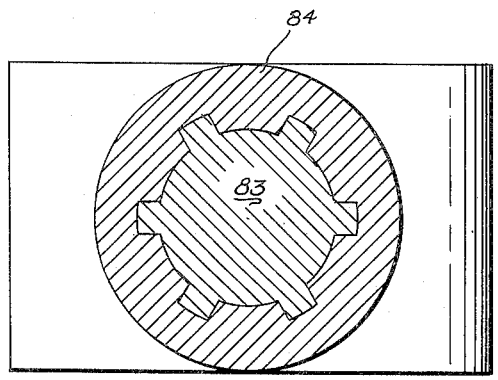
Fig. 14 is an enlarged horizontal section taken along line 14—14 of Fig. 13.
Figure 13:
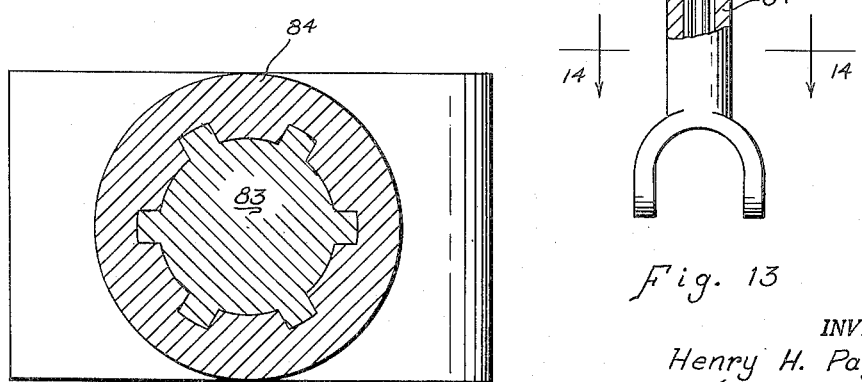
Fig. 13 is a partially broken away view of an element of the machine shown in Figs. 2 and 3.

If a quick setting adhesive is employed, or the speed of the conveyors is rendered slow enough, or if laminated materials are fed into the grip of the conveyors and caused to assume the arcuate shape and then the conveyors arrested for a considerable period of time, the adhesive may set to retain the laminated material in this arcuate shape. I prefer, however, to employ a thermosetting resin and provide means for setting the adhesive while the conveyors are in movement, thus providing a continuous forming machine of large output. In order to set the adhesive, adhesive setting means, in the form of thermo-setting adhesive heat generating means is provided in an intermediate portion of the machine, the heat generating means preferably taking the form of upper electrodes 150 and lower electrodes 151 connected by conductors 152 and 153 respectively to a source of high frequency alternating current (not shown). The electrodes preferably comprise plates or blocks of conductive material and are placed above and below the laminations to cover the adhesive bearing areas thereof in the spaces between the supporting plates 70 shown in Fig. 4. As seen in Fig. 10 various ones of the upright members 21 and 43 support overhanging plates 22 and 44 respectively which are made of dielectric material and the cams 23 and 45 supported thereby may be formed of similar materials with surface plates 155 of suitable metal to guard against wear by the rollers 145. The upwardly projecting ridges 139 on the gripper blocks 135 provide flux shields for reducing by-passing of the adhesive bearing areas. The blocks 135 and the supports 22 and 24 are preferably of such extent that the path of least resistance between the electrodes 150 and 151 is through the material being laminated so that thermosetting heat is quickly generated as the material traverses the machine. As viewed in Fig. 10, it will be noted that the outward extent of the dielectric blocks is such that the space between the electrodes 150 and 151 is very materially less than the space from either of the electrodes to chains supporting such blocks so that all of the dielectric flux will pass through the laminated assembly. As seen in Fig. 1 there are preferably a plurality of pairs of electrodes arranged in sequence, which is preferable to a pair of long electrodes which might permit concentration of flux at a single point.

In order that a smoothly finished beam or similar article may be provided and to assure efficient operation of the heating electrodes, I prefer to provide the inlet portion of the machine with upper and lower planing cutters. The upper planing cutter may be driven by an electric motor 160 mounted upon a suitable stand 161 which is shiftable along certain of the channel members 12 by a shaft 162 and hand wheel 163. The motor 160 drives a planer 164 through belts 165, the planer being so located as to smooth the upper surface of the laminations while the adhesive is still moist and before the adhesive is affected by the heating means. A second motor 166 is suitably mounted on the machine and drives a lower cutter head (not shown) parallel to and immediately beneath the upper cutter head 164 through suitable means such as belts 167. The two planers therefore provide means for planing the surfaces immediately prior to setting of the adhesive. The parallel superimposed arrangement thereof may permit vertical shifting of certain of the laminations so as to provide uniform thickness throughout the beam or article.

Figure 8:
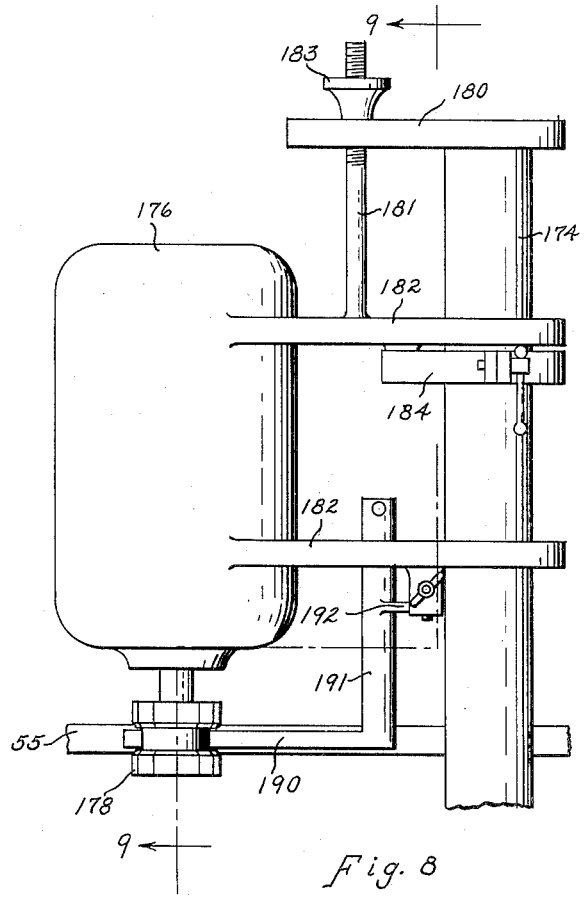
Fig. 8 is an enlarged detail view of a portion of the machine located at the left end of Fig. 2.
Figure 9:
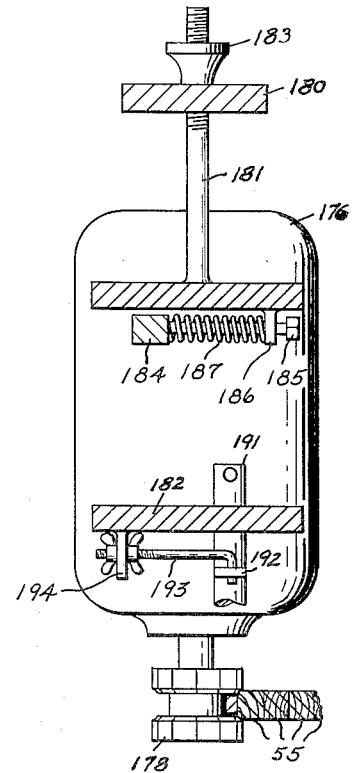
Fig. 9 is a vertical section taken substantially along line 9—9 of Fig. 8.

After the adhesive has set so that spreading of the laminations is no longer possible and the formed article has been released from the grip of the conveyors I may reduce the width of the beam to a standard width, or otherwise shape the beam as by rounding the corners thereof, by passing the beam between vertically positioned planers or milling cutters located at the outlet side of the machine. The vertical millers are preferably mounted upon a block 170 slidable along a bed 171 by means of a pinion (not shown) turned by a crank 172 and engaging a rack 173 on the bed 171. A pair of spaced posts 174 and 175 support motors 176 and 177 respectively, each of which drives a suitable milling cutter 178. As seen in Figs. 8 and 9 a post such as post 174 may be provided with an overhanging shelf 180 through which passes an adjusting screw 181 extending upwardly from the upper arm 182 of a pair of such arms fastened to the motor casing 176, the screw 181 passing through a thumb nut 183 resting upon the shelf 180 and adjustable to move the motor vertically. A vertically adjustable abutment 184 extends outwardly from the post 174 and is provided with a bolt 185 extending through a lug 186 depending from the upper plate 182, there being a spring 187 compressed between the lug 186 and the abutment 184 and tending to maintain the cutter head in operative position against the edge of the beam.

The cutter head illustrated in Figs. 8 and 9 is intended to remove the corners only without lessening the thickness of the beam. For this purpose the cutter head is provided with a central noncutting portion into which projects a finger 190 resting against the surface of the beam. The finger is maintained in proper position by an integral arm 191 extending upwardly through an opening in the lower motor arm 182 and provided with a lug 192 engaged by the depending tip of an adjusting screw 193 passing through a lug 194 depending from the arm 182 and held in adjusted position by suitable wing nuts or the like. The milling cutter may give away from the material as permitted by the spring 187 in the event it strikes a hard spot. If it is desired to smooth the entire surface of the beam the bolt 185 may be adjusted to limit the inward movement of the milling cutter, the finger 190 removed, and a suitable cutter head substituted. Vertical adjustment of the cutters is provided by the screws 181, separation of the cutters is permitted by shifting the position of the abutment 184, and movement of the cutters to accommodate different degrees of curvature is permitted by the crank 172.

Figure 3:
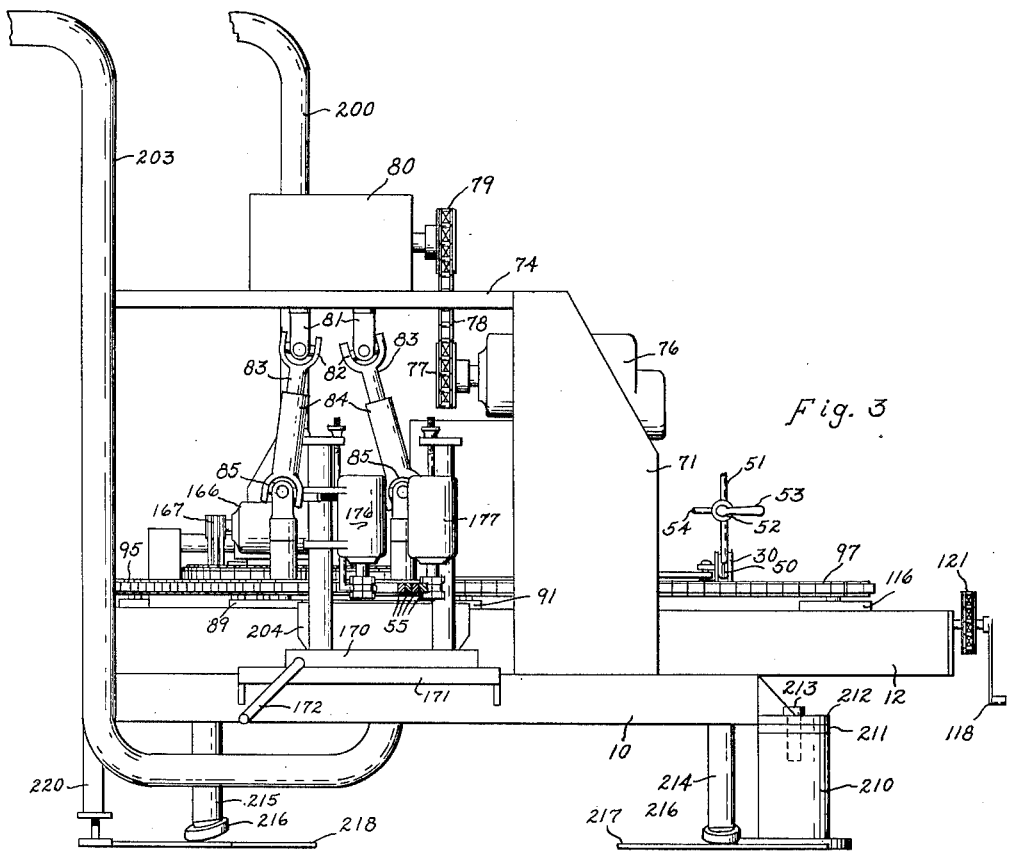
Fig. 3 is an end elevation of the machine looking from the right end of Fig. 1.

In order automatically and continuously to remove sawdust and shavings from the equipment means are preferably provided such as the flexible hose or tube 200 terminating in a suitable hood 201 located in proper relationship to the upper planer 164 at the entering end of the machine. A companion collector is located beneath the machine (not shown) and may include a tube or hose 202 extending toward the exit end of the machine and joining a vertical tube or hose 203 extending thereabove. The tube 203 is provided with collector heads such as the head 204 (Fig. 3) in proper position to collect waste from the vertical milling cutters at the exit end of the machine.

In order to permit shifting of the entire machine in such manner that the entry to the conveyors is always properly aligned with extraneous equipment such as the assembly and feeding table 56 means are provided to permit swinging of the machine about a vertical pivot post 210 located at one side of the machine, preferably in line with the centers of curvature of the various arcs which may be formed by adjusting the chain guides. The pivot post is provided with an anti-friction bearing 211 upon which rests a bracket 212 extending from the support 10 and retained by a pivot pin 213. Suitably spaced beneath the machine are four supporting legs 215. The lower end of each leg supports a canted wheel 216 which may comprise a ball bearing assembly with the outer raceway forming the floor engaging wheel. The axes of the wheels are inclined downwardly and toward the axis of the pivot post so as to intersect the axes of the pivot post below the pivot post. The rear wheels 216 may ride upon short arcuate plates 217 and the front wheels 216 may ride upon longer arcuate plates 218. I have thus provided a construction whereby swinging of the machine with a minimum of manual effort may be accomplished.

In order to hold the machine in the adjusted position I preferably provide at least one braking means comprising a bracket 220 depending from a portion of the frame 10 at a point far removed from the post 210 and having a shoe 221 depending therefrom through adjusting screws 222 which may be tightened until some of the weight of the machine is borne by the shoe 221 to prevent movement of the machine, or loosened to permit adjustment of the machine to accommodate various curvatures of beam or the like.

*Operation*

By way of summary the operation of the machine is as follows: A plurality of elements to be laminated are suitably assembled with adhesive between the various elements. The assembled unit is advanced until engaged by the gripper blocks 135, whereupon further movement is accomplished by the machine elements. The gripper blocks compress and knead the laminations so as to cause them to adjust themselves to the change in shape accomplished by guiding the materials through the arcuate path determined by the setting of the chain guides. While the adhesive is still moist the upper and lower surfaces fo the unit may be planed if desired. Immediately thereafter heat is generated in the material by passing high frequency flux therethrough to set the adhesive while under pressure, thus forming a rigid unit of the laminated pack. Preferably a plurality of pairs of spaced electrodes are provided so as to eliminate any tendency for flux to seek softer spots without accomplishing the heating of the adhesive. After the material has completely cured itself while traversing the remaining portion of the working flights of the conveyors, its edges or vertical surfaces may be trimmed to standard thickness or shape. Various degrees of curvature, from straight line articles to curved articles at the limit of flexibility of the material, may be provided by adjusting the chain guiding members, if necessary substituting longer or shorter adjusting rods for those illustrated. Various widths of pack may be accommodated by separating or bringing together the chain guides and preferably also separating or bringing together the working flight sprockets. Slack may be provided or taken up as required by changes in curvature or width of pack by adjusting the positions of the return flight guiding sprockets. The entire machine may be swung about the pivot post 210 in order to maintain the entry between the working flights in line with extraneous equipment. While the material is still in flexible condition with the adhesive unset the gripping elements are worked or kneaded so as to permit the material to seek positions of least strain.

I have herein illustrated the machine as designed to form arched wooden beams by combining small long bars of squared stock. As seen in Fig. 1, scived joints may be provided in order to utilize smaller lengths of material than required, preferably the joints in each bar being widely spaced from other joints. It is to be appreciated that the machine and method herein disclosed may be utilized to form other laminated articles, structures or the like, such as laminated plywood or curved sheet forms made of laminated wood or other material such as fiberboard, paper, textiles and metals in various combinations.

As explained in my above-mentioned patent, in the manufacture of laminated wooden beams, rough edged boards of varying width will ordinarily be used. As is also pointed out in my above-mentioned patent, it is highly desirable to plane the opposite sides of the assembly while it is under pressure and while the adhesive is in the unset state in order that the electrode plates may be arranged so as to make direct contact with the glue lines in the smooth planar surfaces thus formed. Economy in the consumption of electrical energy is thus obtained and accumulation of adhesive upon the electrode plates is precluded, resulting in high overall efficiency and low manufacturing cost.

While I prefer to employ thermo-setting adhesive and high frequency adhesive setting means, it will be obvious that rapid setting or catalytic setting adhesives may be employed dispensing with the necessity for the heating means. Even in such instances, it is desirable to plane the opposite sides of the assembly while it is moving through the machine in that the extra handling operation is thereby eliminated. The beam may thereby be conveniently reduced to its final desired dimensions in the same operation in which the beam is initially glued up.

It is also to be appreciated that I have illustrated and described a machine wherein rapid production of a large number of articles is permitted by the use of thermosetting adhesives and high frequency flux creating heating means, but other forms of heating means may be employed as permitted by the thickness of the materials and the rate of travel of the conveyor chains. Likewise features and methods herein disclosed may be utilized for the production of laminated articles employing adhesives which may be set by suitable chilling means rather than heating means, or intermittent operation may be accomplished without chilling or heating the adhesive by running a laminated pack into the machine and holding it there until the adhesive sets.

Various modifications in detail and arrangement of the machine and various alterations in the process herein disclosed will readily occur to those skilled in the art. All such modifications as come within the true spirit and scope of the appended claims are considered to be a part of my invention.

I claim:

1. In a machine for forming laminated wooden beams from smaller bars which have been placed side by side and provided with adhesive between contiguous faces, a pair of endless conveyors arranged with adjacent working flights traveling in the same direction and engaging the outer faces of the outer pair of bars while the adhesive sets, guiding means arranged to maintain said working flights in substantial parallelism, adjustment means extending longitudinally of one of said working flights and engaging the guide means associated with said one working flight for shifting said one working flight toward the other of said working flights.

2. In a machine for forming laminated beams from smaller bars which have been placed side by side and provided with adhesive between contiguous faces, a pair of endless conveyors arranged substantially horizontally in a common plane with adjacent working flights traveling in the same direction and engaging the outer faces of the outer pair of bars while the adhesive sets, guiding means engaging each of said working flights to maintain said working flights in substantial parallelism, and a pressure member extending longitudinally of said working flights and operatively engaging all of said guiding means engaging one of said working flights for urging said one working flight toward the other of said working flights.

3. In a machine for forming laminated wooden beams from smaller bars which have been placed side by side and provided with adhesive between contiguous faces, a pair of endless conveyors arranged with adjacent working flights traveling in the same direction and engaging the outer faces of the outer pair of bars while the adhesive sets, and arcuately arranged guiding means engaging each of said working flights to maintain said working flights in substantially parallel arcs, and an elongated straight pressure member extending in the direction of said working flights and operatively engaging all of said guiding means engaging one of said working flights to urge said one working flight with substantially uniform pressure against said bars throughout the entire length of said one working flight.

4. In a machine for forming laminated wooden beams from smaller bars which have been placed side by side and provided with adhesive between contiguous faces, a pair of endless conveyors extending wholly in a common horizontal plane and arranged with adjacent working flights traveling in the same direction and adapted for engaging the outer vertically extending faces of the outer pair of bars while the adhesive sets, and a plurality of separately adjustable guiding means engaging each of said working flights and adjustable to maintain said working flights in substantial parallelism in one of a plurality of selectable arcuate positions of different degrees of curvature lying within the horizontal plane.

5. The combination set forth in claim 4 in which said conveyors comprise sprocket chains and sprockets journalled for rotation about vertical axes about which said sprocket chains pass.

6. The combination set forth in claim 4 in which said conveyors comprise sprocket chains and sprockets about which said sprocket chains pass, said sprockets comprising working flight sprockets and separate return flight sprockets.

7. The combination set forth in claim 4 in which said conveyors comprise sprocket chains and sprockets about which said sprocket chains pass, said sprockets comprising working flight sprockets and separate return flight sprockets, and adjustable mounting means for the working flight sprockets of at least one of said conveyors whereby beams of various widths may be formed.

8. The combination set forth in claim 4 in which said conveyors comprise sprocket chains and sprockets about which said sprocket chains pass, said sprockets comprising working flight sprockets and separate return flight sprockets, adjustable mounting means for the working flight sprockets of at least one of said conveyors whereby beams of various widths may be formed, and adjustable mounting means for at least one of said return flight sprockets of each conveyor whereby to provide or take up slack as said working flight sprockets are adjusted to accommodate different widths of beams or as said guiding means are adjusted to form beams of different curvatures.

9. The structure set forth in claim 4; in combination with a horizontally extending rigid support for said conveyors and guiding means, and vertical shaft means pivotally mounting said support to permit partial rotation of said support about a vertical axis whereby to permit adjustment of the angular position of said machine about said vertical shaft.

10. In a machine for forming curved laminated articles from smaller straight articles which have been placed face to face and provided with adhesive between contiguous faces, a pair of endless conveyors arranged substantially horizontally in a common plane with adjacent working flights traveling in the same direction and engaging the outer faces of the outer pair of articles while the adhesive sets, a plurality of separately adjustable guiding means engaging each of said working flights and adjustable to maintain said working flights in substantial parallelism in a plurality of arcuate positions of different degrees of curvature, and a single pressure member operatively engaging all of said guiding means engaging one of said working flights for simultaneously and uniformly urging said one working flight throughout its entire length toward the other of said working flights.

11. The combination set forth in claim 10 in which said pressure member comprises an expansible tubular element extending longitudinally of said working flights.

12. The combination set forth in claim 10 in which said conveyors comprise sprocket chains and sprockets about which said sprocket chains pass, said sprockets comprising working flight sprockets and separate return flight sprockets, and said pressure member is arranged between said working flight sprockets and said return flight sprockets of one of said conveyors.

13. The combination set forth in claim 10 in which said conveyors comprise sprocket chains and sprockets about which said sprocket chains pass, said sprockets comprising working flight sprockets and separate return flight sprockets, and adjustable mounting means between said pressure member and said guide means for the working flight sprockets of at least one of said conveyors whereby laminated articles of various widths may be formed.

14. The combination set forth in claim 10 in which said conveyors comprise sprocket chains and sprockets about which said sprocket chains pass, said sprockets comprising working flight sprockets and separate return flight sprockets, adjustable mounting means for the working flight sprockets of at least one of said conveyors whereby laminated articles of various widths may be formed, and adjustable mounting means for at least one of said return flight sprockets of each conveyor whereby to provide or take up slack as said working flight sprockets are adjusted to accommodate different widths or as said guiding means are adjusted to form different curvatures.

15. In a machine for forming laminated wooden beams from smaller bars which have been placed side by side and provided with adhesive between contiguous faces, a pair of endless conveyors arranged substantially horizontally in a common plane with adjacent working flights traveling in the same direction and engaging the outer faces of the outer pair of bars while the adhesive sets, and guiding means arranged to maintain said working flights in substantially parallel arcs, said conveyors comprising sprocket chains, the links of which comprise outwardly projecting gripper blocks having rounded work-engaging surfaces and upwardly projecting stems, and said guiding means comprising a plurality of curved cams adapted to engage said stems and shift said gripper blocks from side to side.

16. In a machine for forming laminated wooden beams from smaller bars which have been placed side by side and provided with adhesive between contiguous faces, a pair of endless conveyors arranged with adjacent working flights traveling in the same direction and engaging the outer faces of the outer pair of bars while the adhesive sets, and guiding means arranged to maintain said working flights in substantial parallelism, said conveyors comprising sprocket chains, the links of which comprise outwardly projecting gripper blocks having rounded work-engaging surfaces and projections, and said guiding means comprising a plurality of cams adapted to engage said projections to shift said gripper blocks.

17. In a continuous gluing machine for forming laminated wooden beams from smaller bars which have been placed side by side and provided with thermo-setting adhesive between contiguous faces, a pair of endless conveyors arranged with adjacent working flights traveling in the same direction and engaging the outer faces of the outer pairs of bars so as to compress the bars therebetween in a direction normal to said faces, a pair of planing means mounted above and below said conveyors for providing smooth plane surfaces upon the assembly of bars between said working flights free of excess adhesive, and adhesive setting means comprising electrode plates arranged between said working flights rearwardly of said planing means and adapted to engage with the planed surfaces on the opposite sides of the assembly of bars between said working flights.

18. A continuous gluing machine for making laminated wooden members utilizing a plurality of longitudinal wooden strips of random widths which are assembled together in a side by side relation with a film of thermosetting adhesive between each adjacent pair of strips, said machine comprising a pair of cooperating conveyor means including means for applying pressure to the opposite edges of said assembly in a direction normal to said adhesive films to force said adjacent side surfaces of said strips tightly together and to express excess of adhesive outwardly of said assembled strips, means for driving said conveyor means for moving said compressed assembly of strips continuously in a direction longitudinally thereof, planing means mounted on opposite sides of said conveyor means for planing the opposite uneven sides of said assembly normal to said films while moving under pressure to remove excess wood and adhesive from the edges of strips of excess width to provide smooth plane surfaces on each of the opposite sides of said assembly normal to the planes of said adhesive films, and a pair of high-frequency heating electrode means mounted on opposite sides of said conveyor means behind said planing means and arranged for contacting engagement with the adhesive lines in said plane surfaces while said pressure is maintained upon the opposite edges of said assembly.

19. A continuous gluing machine for making laminated wooden members from longitudinal wooden strips of random widths of relatively wide sides and relatively narrow edges, formed into an assembly of a plurality of said strips in a side by side relation with films of fluid, thermosetting adhesive therebetween, a pair of continuous conveyors having cooperating evenly spaced apart working flights, means operatively connected to at least one of said working flights for applying pressure to the opposite edges of said assembly in a direction normal to said adhesive films to force said adjacent side surfaces of said strips tightly together and squeeze excess adhesive from therebetween, a pair of planer heads mounted on opposite sides of the space between said working flights and intermediate the opposite ends of said working flights and adapted for planing the opposite sides of said assembly normal to said adhesive films to remove excess wood from the edges of said strips and excess adhesive simultaneously from the opposite sides of said assembly while moving under pressure to form parallel smooth planar surfaces on each of the opposite sides of said assembly normal to said adhesive films, a pair of high frequency heating electrode plates mounted between said planer heads and the rear ends of said working flights mounted for contacting engagement with the glue lines in said opposite planar surfaces of said assembly.

20. A continuous gluing machine for making smooth-surfaced laminated wooden members from a plurality of longitudinal wooden strips having relatively wide sides and relatively narrow rough edeges and formed into an assembly in a side by side relation with films of fluid adhesive therebetween and with said rough edges exposed on each of the opposite sides of said assembly, said machine comprising means for applying pressure to the opposite edges of said assembly normal to the adhesive films to force the adjacent surfaces of said strips tightly together and to express excess adhesive from therebetween, conveyor means for moving the compressed assembly of strips continuously in a direction longitudinally thereof, driving means connected to said conveyor means, a pair of planer heads for planing said opposite rough sides of said compressed assembly to form smooth parallel planar surfaces upon each of the opposite sides of said assembly normal to said adhesive films while said assembly is in motion and under pressure, and high frequency heating means arranged adjacent said conveyor means rearwardly of said planer heads and spaced apart the same distance as said planer heads whereby said heating means will contact said planar surfaces for effecting rapid setting of said adhesive films while said assembly is under pressure.

21. A continuous gluing machine for making smooth-surfaced laminated wooden members from longitudinal wooden strips having unfinished edge surfaces and side surfaces and formed into an assembly in a side by side relation with said edge surfaces exposed flatwise on each of the opposite sides of said assembly and with films of moist adhesive between adjacent side surfaces, a pair of cintinuous conveyor chains having cooperating spaced apart working flights arranged in an arcuate configuration and adapted for moving said assembly of strips continuously in a direction longitudinally thereof, pressure means operatively connected to one of said working flights for applying pressure to opposite side edges of said assembly to force the adjacent adhesive bearing surfaces of said strips tightly together, and planer means mounted on opposite sides of said conveyors for finishing the opposite side surfaces of said assembly by removing the unfinished edge surface portions of said strips to provide smooth planar surfaces on each of the opposite sides of said assembly while the latter is in motion and before said adhesive has set, and high frequency heating means arranged adjacent said conveyor chains on opposite sides of the space between said working flights for effecting heating and setting of the adhesive films between adjacent wooden strips while said assembly is in motion and under pressure, said heating means being arranged rearwardly of said planer means and spaced apart the same distance as said planer means so as to make contacting engagement with said smooth planar surfaces.

22. In a continuous gluing machine for forming laminated articles from smaller articles which have been placed side by side and provided with adhesive between contiguous faces, a pair of endless conveyors arranged with adjacent working flights traveling in the same direction and engaging the outer faces of the outer pair of articles while the adhesive sets, pressure means operatively engaging the working flight of one of said conveyors throughout the entire length thereof for compressing said articles between said working flights in a direction normal to said faces, said conveyors comprising sprocket chains having blocks wholly of dielectric material for engaging said articles projecting outwardly from the links thereof, each of said blocks being secured to and supported by separate individual links of said chains, and a pair of high frequency electrode plates placed respectively above and below said conveyors across the space therebetween in vertically spaced relation to each other, the outward projection of said blocks being such that the space between said electrodes is less than the space from either of said electrodes of either of said chains.

23. In a continuous gluing machine for making laminated wooden members from a plurality of longitudinal wooden strips of varying widths which are formed into an assembly in a side-by-side relation with a film of adhesive between each adjacent pair of strips, said machine comprising a pair of conveyor means having cooperating, evenly spaced apart working flights, pressure means operatively connected to the working flight of one of said conveyors for applying pressure to the opposite edges of said assembly in a direction normal to said adhesive films and to force said adjacent side surfaces of said strips tightly together, means for driving said conveyors, a pair of planer heads mounted on opposite sides of said conveyors intermediate the opposite ends thereof for planing the opposite uneven sides of said assembly normal to said adhesive films while moving under pressure, said planer heads being mounted adjacent the forward ends of said conveyors, and heating means arranged adjacent said conveyors rearwardly of said planer heads for engaging the planed surface of said assembly for effecting rapid setting of said adhesive while said assembly is under pressure between said working flights.

HENRY HARRIS PAYZANT.

References Cited in the file of this patent

UNITED STATES PATENTS

| Number | Name | Date |
|---|---|---|
| 876,292 | Boenning | Jan. 7, 1908 |
| 966,983 | Anduaga | Aug. 9, 1910 |
| 1,704,677 | Blood | Mar. 5, 1929 |
| 1,792,596 | Livingston | Feb. 17, 1931 |
| 2,137,506 | Osgood | Nov. 22, 1938 |
| 2,231,457 | Stephen | Feb. 11, 1941 |
| 2,242,179 | Gustin | May 13, 1941 |
| 2,273,653 | Melby | Feb. 17, 1942 |
| 2,305,525 | Gustin | Dec. 15, 1942 |
| 2,317,281 | Linquist | Apr. 20, 1943 |
| 2,344,488 | Bowling | Mar. 21, 1944 |
| 2,366,588 | Bolling | Jan. 2, 1945 |
| 2,373,376 | Bolling | Apr. 10, 1945 |
| 2,378,244 | Pfenning | June 12, 1945 |
| 2,490,819 | Lambert et al. | Dec. 13, 1949 |

FOREIGN PATENTS

| Number | Country | Date |
|---|---|---|
| 563,097 | Great Britain | July 28, 1944 |
| 871,825 | France | May 18, 1942 |